United States Patent [19]
Lau et al.

[11] Patent Number: 5,717,270
[45] Date of Patent: Feb. 10, 1998

[54] NOISE SUPPRESSION CAPACITOR ARRANGEMENT ON A ROTOR OF AN ELECTRIC MOTOR

[75] Inventors: James Ching Sik Lau, North Point; Ho Seung Pun, Chaiwan, both of Hong Kong

[73] Assignee: Johnson Electric S.A., Switzerland

[21] Appl. No.: 560,208

[22] Filed: Nov. 21, 1995

[30] Foreign Application Priority Data

Nov. 24, 1994 [GB] United Kingdom ............ 9423689

[51] Int. Cl.$^6$ .................... H02K 11/00; H02K 11/02
[52] U.S. Cl. .................. 310/220; 310/68 R; 310/51; 310/233; 310/221
[58] Field of Search ............................ 310/220, 233, 310/221, 51, 72, 68 R

[56] References Cited

U.S. PATENT DOCUMENTS

| | | |
|---|---|---|
| 3,322,988 | 5/1967 | Ishikawa et al. ............ 310/220 |
| 3,488,538 | 1/1970 | Hayashi .................... 310/220 |
| 3,594,598 | 7/1971 | Schaub ..................... 310/220 |
| 4,329,605 | 5/1982 | Angi et al. ................. 310/68 R |
| 4,584,498 | 4/1986 | Strobl ...................... 310/71 |
| 4,859,893 | 8/1989 | Wang ....................... 310/220 |
| 5,003,208 | 3/1991 | Hama et al. . | |

FOREIGN PATENT DOCUMENTS

| | | | |
|---|---|---|---|
| 55-41138 | 3/1980 | Japan .................... 310/220 |
| 1169058 | 2/1984 | U.S.S.R. . | |
| 1547093 | 6/1979 | United Kingdom ........ 310/220 |
| 2177854 | 1/1987 | United Kingdom ........ 310/220 |
| 2202688 | 9/1988 | United Kingdom ........ 310/220 |
| 2246913 | 2/1992 | United Kingdom . | |

*Primary Examiner*—Steven L. Stephan
*Assistant Examiner*—Burton S. Mullins
*Attorney, Agent, or Firm*—Ostrolenk, Faber, Gerb & Soffen, LLP

[57] ABSTRACT

A rotor for an electric motor comprises a shaft, a commutator fitted to the shaft and connected to a winding wound around poles of an armature core, and a noise suppressor. The noise suppressor 40 has chip capacitors 44 connected to terminal portions 38 of commutator segments 32. The capacitors 44 have a common terminal 45 connected together to form a star connection via a ring formed from a conductive layer 42 on a board 41 or from resilient wire. The capacitors 44 may be soldered to the wire ring and to the commutator segments or may be held in recesses formed in the base of the commutator in direct contact with the commutator segments under resilient urgings of the ring to form a solderless connection. It is particularly suited to rotors using mechanical connection type commutators to form solder-free rotors.

22 Claims, 6 Drawing Sheets

NOISE SUPPRESSION CAPACITOR ARRANGEMENT ON A ROTOR OF AN ELECTRIC MOTOR

FIELD OF THE INVENTION

This invention relates to rotors for electric motors and in particular, to rotors for miniature permanent magnet direct current (PMDC) motors incorporating capacitors for suppression of electrical noise.

BACKGROUND ART

Commutators are a major source of electrical noise in miniature PMDC motors. As the brushes transfer from one segment to another, sparks are produced which create electrical noise and increase wear of the commutator and brushes. By suppressing these sparks, the noise level can be reduced and the service life of the motor increased. Varistor or resistor rings may be fitted to the commutator, usually by soldering to tangs used for connecting the winding of the rotor to the commutator, for suppressing these sparks. See for example, GB 2202688. Alternatively, capacitors and/or chokes may be connected to the motor terminals, usually inside the motor end cap or on the brush mounting plate, to suppress the transmission of the noise to the motor's power supply.

However, better noise suppression has been achieved by connecting capacitors directly to the winding of the rotor. The capacitors may have one lead connected together to form a star point and the other lead connected to a respective commutator tang, there being an equal number of capacitors and poles of the rotor. A known arrangement is shown in GB 2246913 in which the capacitors are electrolytic type capacitors disposed within the winding tunnels of the rotor with the star point connected at the opposite end of the rotor to the commutator.

While this functions satisfactorily, it has certain drawbacks. It is not particularly suited to automated assembly and as the capacitors are of significant size, this technique cannot be used where the winding tunnels are relatively full of wire.

SUMMARY OF THE INVENTION

The present invention seeks to overcome these problems by providing a wound rotor in which chip capacitors are connected between a star point connection ring and terminal portions of the commutator.

Accordingly, the present invention provides a rotor for an electric motor comprising a shaft, a commutator fitted to the shaft, an armature core forming a number of poles and a winding wound around the poles and connected to the commutator and noise suppression means, wherein the commutator has a plurality of commutator segments mounted on a commutator base, the segments having contact portions for making sliding contact with the brushes and terminal portions for connection to the winding, wherein the noise suppression means comprises a plurality of chip-type capacitors, each having a first and second terminal face, each first terminal face being connected to a respective commutator segment and each second terminal face being electrically connected together to form a star point connection.

By using chip-type capacitors, the superior noise suppression performance by using capacitors mounted on the rotor can be realised even when the winding tunnels are substantially fully occupied by the windings of the rotor.

Preferably, the second terminal faces are connected together by a conductive ring. This ring may be formed from a sheet material, e.g., brass, or PC board, from conductive rubber rings or strips, or from a length of resilient wire. By forming the ring from resilient wire, the resilience of the wire can be used to assist holding the capacitors in place while they are being soldered to the commutator segments. Indeed, in certain arrangements, the resilient urgings of the ring may be sufficient to maintain good electrical contact between the capacitors and the commutator segments and/or ring, avoiding the need for soldering although soldering the capacitors to the ring may aid assembly in certain embodiments.

By connecting the capacitors to the terminal portion of the commutator segments, the length of the commutator/rotor can be maintained to a minimum.

Preferably, the terminal portions are formed with insulation displacing mechanical connection type terminals for connecting with the rotor windings and are accommodated in the crown portion of the commutator base. This allows the construction of the rotor to be solder-free. A positive location for the chip capacitors can be provided by locating the capacitors in recesses or openings formed in the commutator base which may also provide locating means for the ring. Ideally, the capacitors are located radially outward of the terminals.

The capacitors may be orientated axially or radially and fingers may be formed on the terminal portions and located to make contact with the first terminal face of the capacitors in either the axial or radial direction. If a retaining ring is used to retain the segments on the commutator base, the retaining ring may also retain the capacitors in contact with the commutator segments.

Preferred embodiments of the invention will now be described, by way of example only, with reference to the accompanying drawings.

DETAILED DESCRIPTION OF THE PREFERRED EMBODIMENTS

Figure 1:
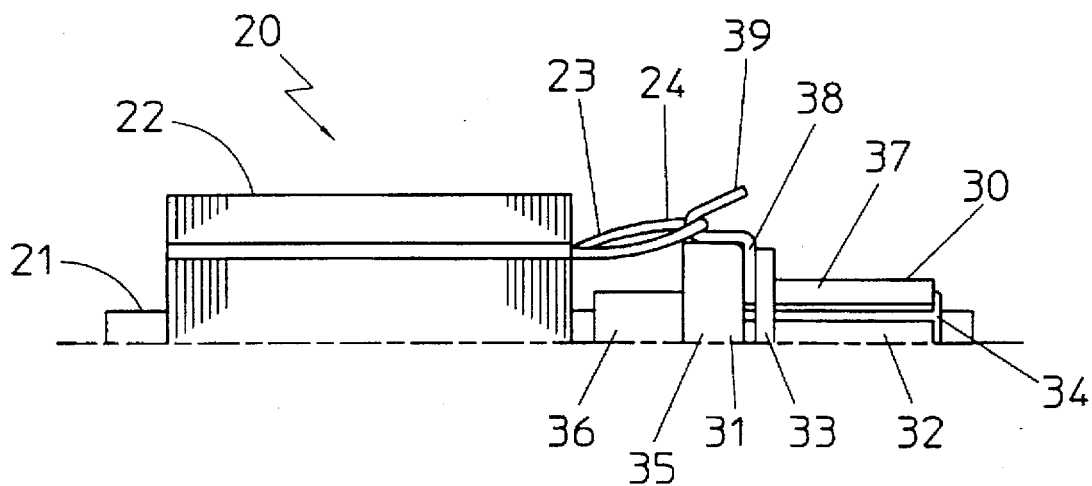
FIG. 1 is a schematic side view of a top half of a rotor showing a weldable commutator prior to fixing of a rotor winding.
Figure 2:
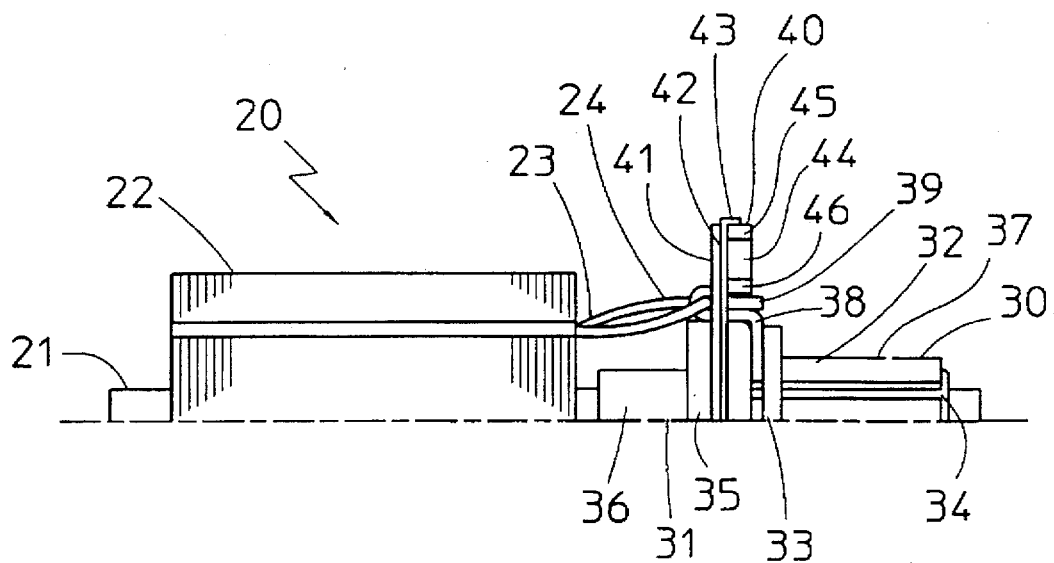
FIG. 2 is a schematic side view of the commutator of FIG. 1 after fixing of the rotor winding and fitting of a noise suppressor in accordance with a first embodiment of the present invention.

In FIGS. 1 and 2, the top haft of a rotor 20 is shown. The rotor 20 comprises a shaft 21 on which is fitted an armature core 22 comprising a plurality of stacked armature laminations. A rotor winding 23 is wound around the armature core to form wound armature poles.

A commutator 30 is fitted to the shaft 21 adjacent the armature core 22. The commutator comprises a commutator base 31, a number of commutator segments 32 and a retaining ring 33. The commutator base is moulded from a suitable plastics material such as phenolic or nylon and has a segment support portion 34, a collar 35 and a spacer portion 36. The spacer portion 36 abuts the armature core 22 to axially space the commutator segments 32 from the armature core. The commutator segments 32 are retained on the commutator base by a retaining ring 33.

The commutator segments have a sliding portion 37 for making sliding contact with carbon brushes of the motor and a terminal portion 38 to which connection portions 24 of the armature winding 23 are connected. In FIGS. 1 to 6, the terminal portion of the commutator is of the weldable type, having a U-shaped tang 39 which faces away from the armature core and around which a connection portion 24 of the winding 23 is looped during winding of the armature core 22, as shown in FIG. 1.

Once the rotor has been wound, the windings are electrically connected to the commutators by a hot forging process in which the tangs 39 are subjected to heat and pressure to collapse the tangs 39 onto the connection portion 24 and to remove insulation from that portion of the winding wire which is in contact with the tang. The tang 39 is seated on and supported by the collar during the forging operation. The tang 39 thus takes a form similar to that shown in FIGS. 2 and 3.

The commutator has a number of segments corresponding to the number of poles of the rotor although only one is shown for clarity. The rotor construction so far described is well known in the art.

In FIG. 2, a noise suppression device is shown fitted around the tangs of the commutator. The noise suppression device 40 is more clearly shown in FIGS. 3 and 4.

Figure 3:
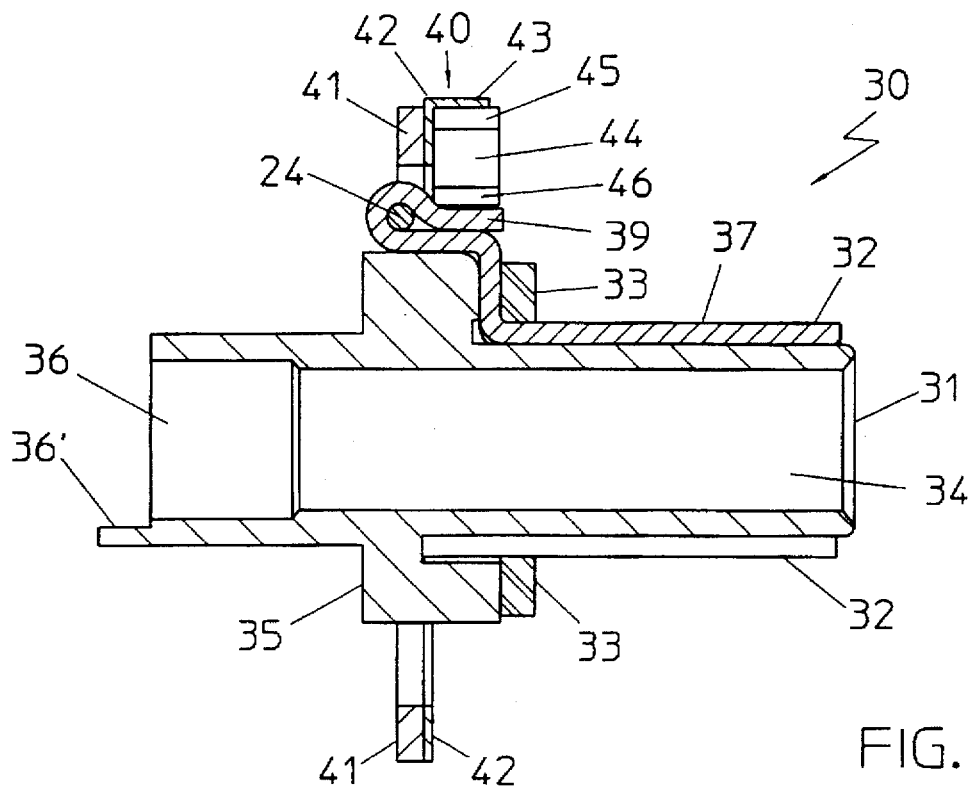
FIG. 3 is an enlarged sectional view of the commutator of FIG. 2 showing the connection of the noise suppressor.
Figure 4:
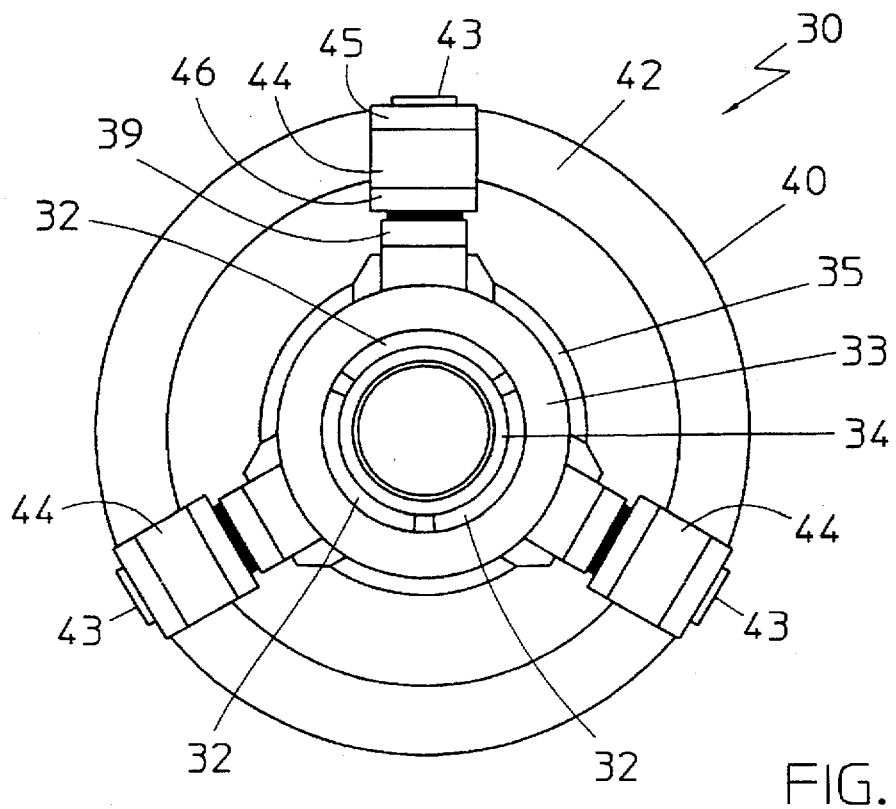
FIG. 4 is an end view of the commutator assembly of FIG. 3.

The noise suppression device 40 comprises an annular board 41 of non-conductive material supporting a conductive layer 42 which may be, for example, a copper film formed on the board 41. The conductive layer has a number of fingers 43 which extend at 90° to the board and are soldered to chip-type capacitors 44. Each capacitor 44 has two terminal faces 45 and 46 and is supported by the board by being soldered at its terminal face 45 to one of the fingers 43. The other terminal face 46 of the capacitors is soldered to a respective commutator tang. In the embodiment of FIGS. 3 and 4, there are 3 capacitors, one for each commutator segment, corresponding to the number of poles of the rotor. As each capacitor is connected to the conductive layer 42, the layer forms a star point connection ring connecting one terminal 45 of each of the capacitors together and forming a star connection with the armature windings via the commutators. In FIG. 3, the commutator base 31 has a small projection 36' formed at the end of the spacer portion which cooperates with a recess (not shown) in the armature core to correctly orientate the commutator on the shaft with respect to the armature core to ensure the desired commutation angle.

Figure 5:
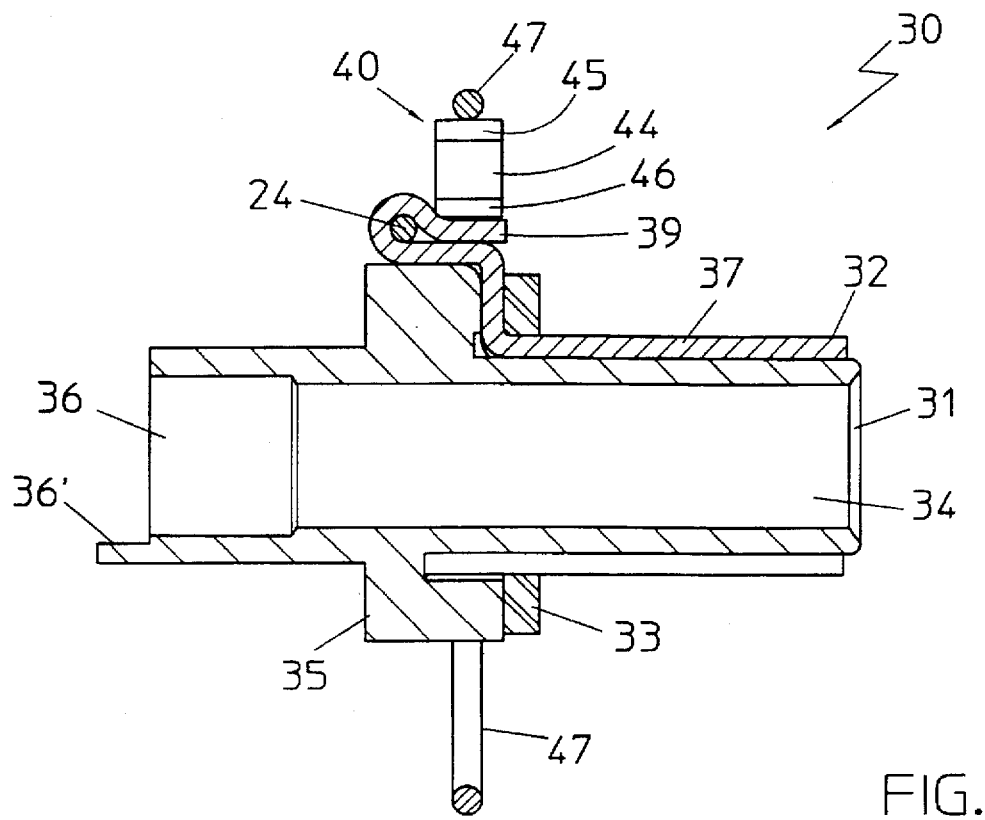
FIG. 5 is a sectional view similar to FIG. 3 with an alternative embodiment of the noise suppressor.
Figure 6:
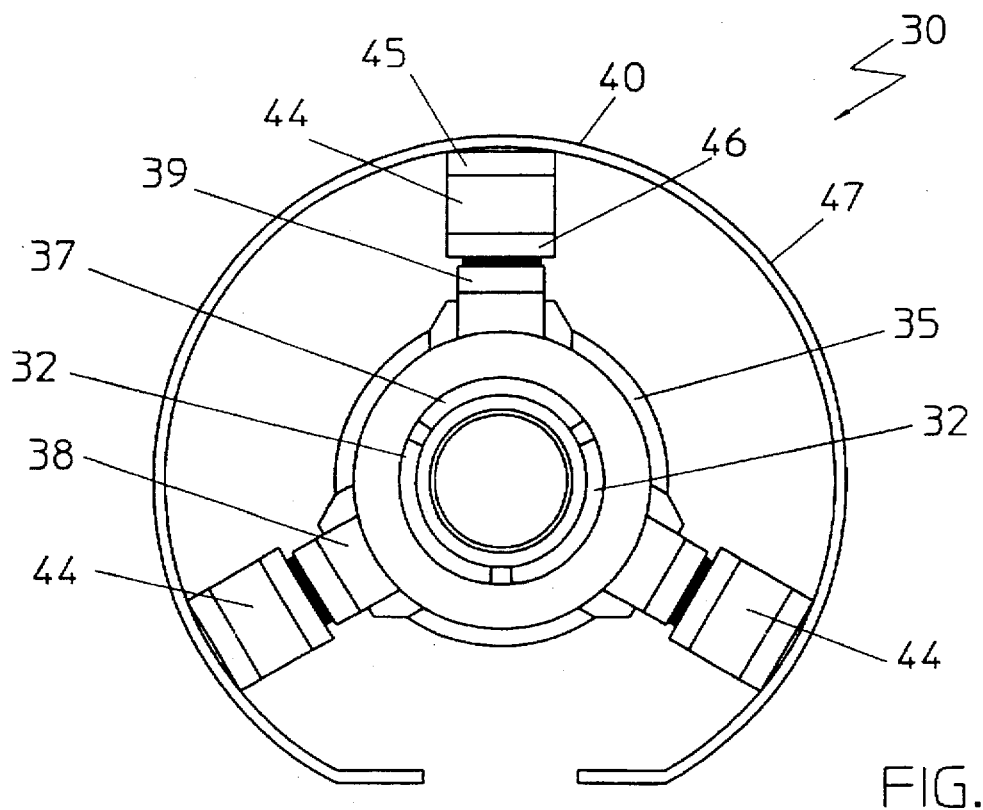
FIG. 6 is an end view of the commutator assembly of FIG. 5.

FIGS. 5 and 6 show a slight variation in which the board 41 and conductive layer 42 of the noise suppression device 40 is replaced by a resilient wire ring 47. The capacitors 44 are soldered directly to the wire ring on their outer terminal face 45 and soldered directly to the commutator tang 39 on their inner terminal face 46. By soldering the capacitors to the wire ring 47 first, the resilience of the ring can be used to urge the capacitors into contact with the tangs to aid soldering or even avoid the need for soldering in certain arrangements. In some applications, where the capacitors are not soldered to the tangs, a small amount of flexible adhesive may be used to strengthen the retention of the capacitors under rapid speed changes.

FIGS. 7 to 12 refer to a mechanical connection or solderless type commutator such as that described in U.S. Pat. No. 4,584,498. In this type of commutator, the commutator base has a segment support portion 34 and a spacer portion 36 as before. However, the collar 35 is replaced by a crown 50. The crown has recesses 51 for accommodating the terminal portion 38 of the commutator segments 32 as well as slots 52 for receiving the connection portions 24 of the winding 23 for connection to the commutator segments 32.

In addition, the crown has further recesses 53, radially outward of the terminal recesses 51, for accommodating the chip-type capacitors 44. The top of the capacitor recesses 53 has a slot 54 for receiving the wire ring 47. The capacitors 44 are placed axially into the capacitor recesses 53 and the wire ring is resiliently brought to bear on the capacitors' terminal face 45. As shown, the wire ring 47 bears resiliently on the radially outer edge of the terminal face 45 although of course the wire ring could be soldered to terminal face 45 similar to the embodiment of FIGS. 5 and 6, except that the capacitors extend axially and with suitable modifications made to the capacitor recesses 53 to accommodate the wire ring 47. The capacitors 44 are held in the capacitor recesses 53 by the commutator segments assisted by retaining ring 33, if fitted.

Figure 9:
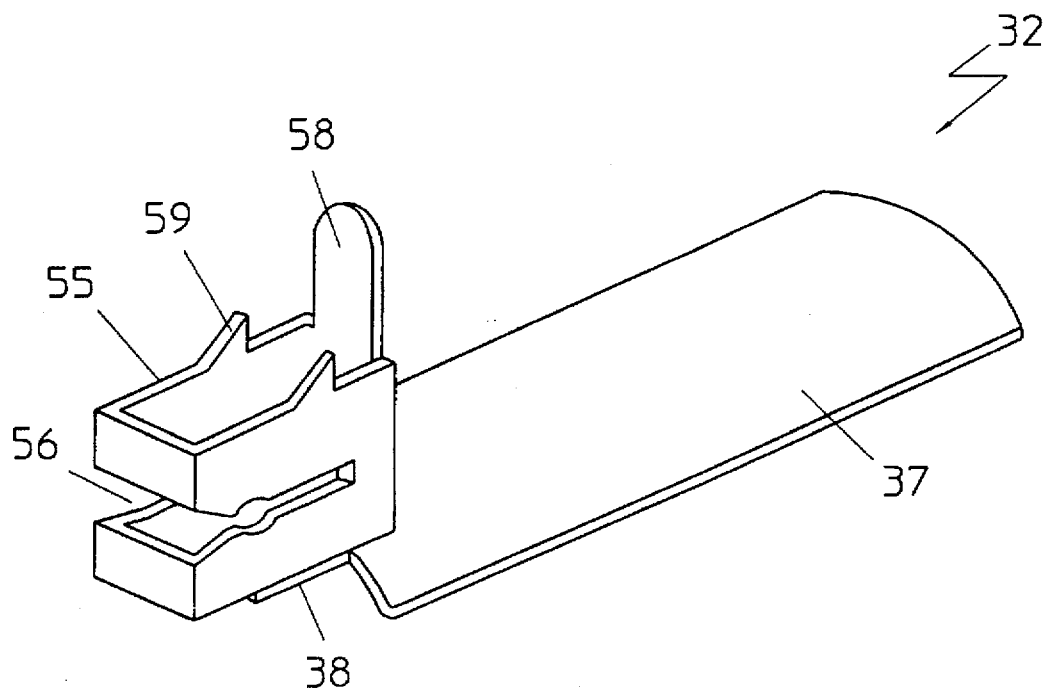
FIG. 9 is an isometric view of a segment of the commutator of FIGS. 7 and 8.

The commutator segments 32, as shown more clearly in FIG. 9, have a sliding portion 37 similar to that previously described but the terminal portion 38 is formed with a mechanical connection or insulation displacing connection type terminal 55. This terminal 55 is accommodated within one of the terminal recesses 51 of the crown. The terminal is box-like with an open top and having a slot 56 cut through the forward face and along the two side faces. The slot 56 is wider in the front face of the terminal than along the side faces to accommodate an anvil 57 formed within the terminal recesses 51 for supporting the connection portion 24 of the winding 23 as the terminal 55 is inserted into the crown 50. The slots 56 straddle and grip the connection portion 24 as the terminal 55 is inserted, at the same time slicing through the insulation of the wire to make electrical contact therewith.

Figure 7:
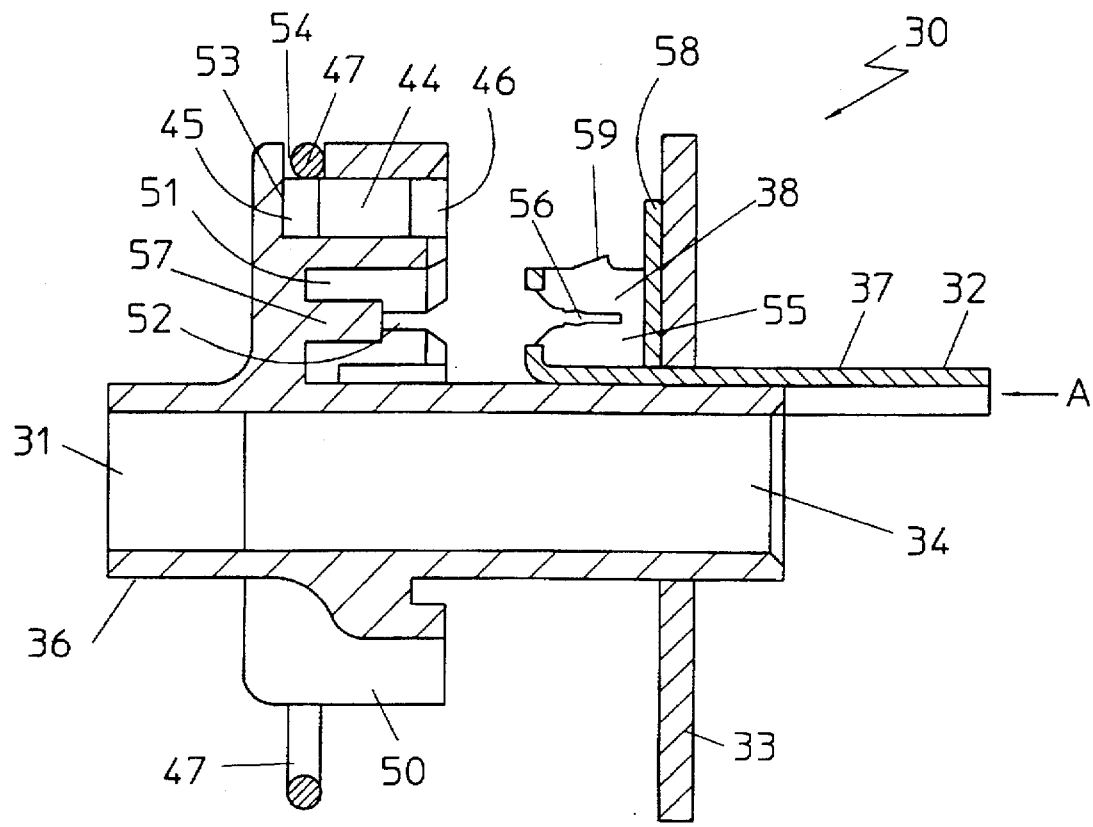
FIG. 7 is a schematic cross-section of a partly assembled commutator having a solder-free terminal portion according to an alternative embodiment.

A finger 58 extends radially from the rear wall of the terminal 55 for making contact with a respective capacitor 44. As shown in FIG. 7, a retaining ring 33 retains the segments on the commutator base and at the same time, supports the fingers 58. Barbs 59 formed on the terminals engage with walls of the recesses 51 to resist withdrawal of the terminals from the crown once fitted. The commutator segments 32 are fitted to the base by mounting the segments on the base 31 as shown in FIG. 7 and then moved in the direction indicated by arrow "A" to insert the terminals 55 into the recesses 51 in the crown 50.

Figure 8:
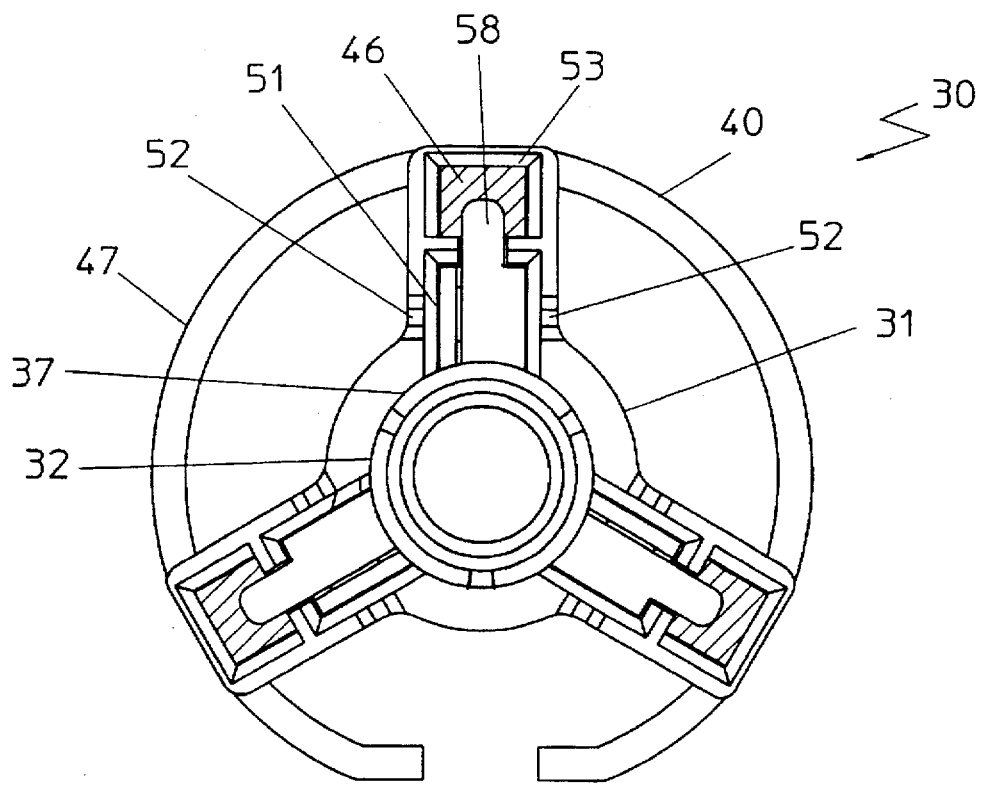
FIG. 8 is an end view of the commutator of FIG. 7 once assembled but with a retaining washer omitted for clarity.

The retaining ring 33 has been omitted from FIG. 8 for clarity from which it can be seen that the fingers 58 extend radially to make contact with the terminal faces 46 of the capacitors 44.

Figure 10:
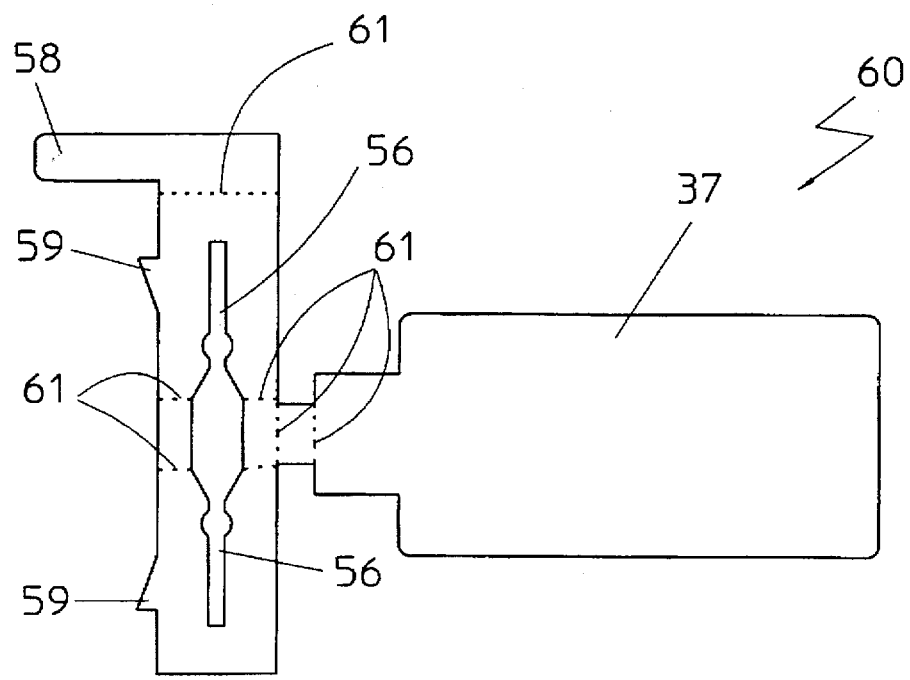
FIG. 10 is a blank for forming the segment of FIG. 9.

FIG. 10 shows a blank for forming the terminal segment 32 of FIG. 9. The blank 60 is cut from a sheet of suitable material such as beryllium copper and folded along the five fold lines 61 to form the commutator segment of FIG. 9. The sliding portion 37 is curved during forming so that the sliding portions of the assembled commutator form a barrel-like cylindrical sliding contact surface.

Figure 11:
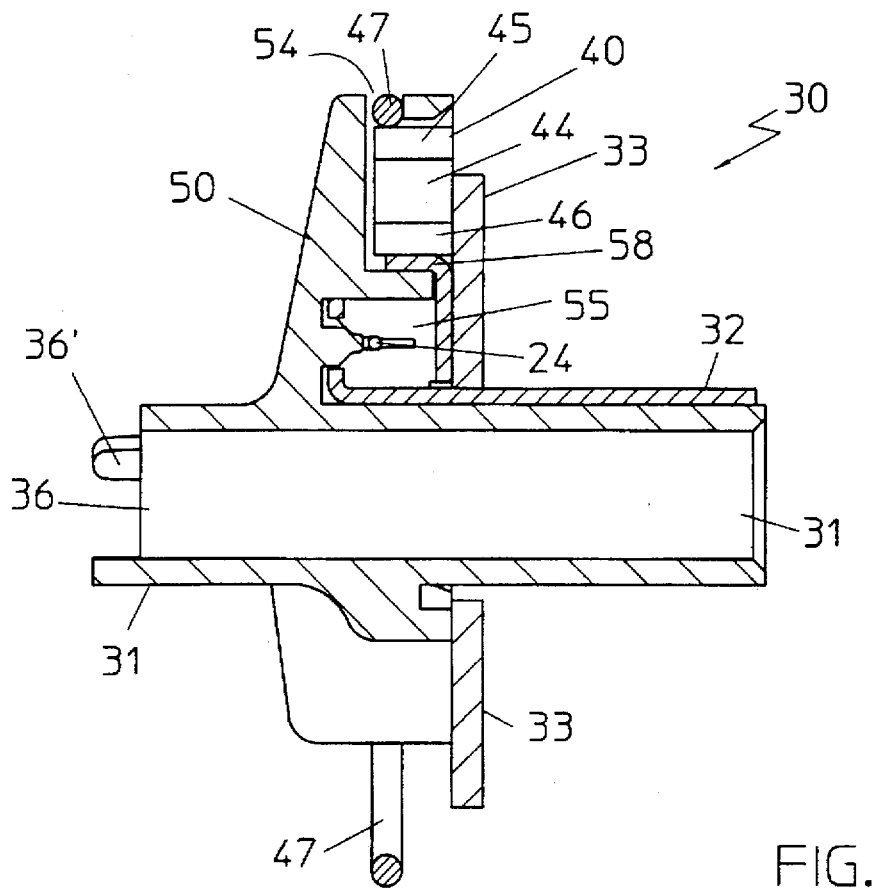
FIG. 11 is a cross-section of a commutator assembly showing a variation to the arrangement of FIG. 7.
Figure 12:
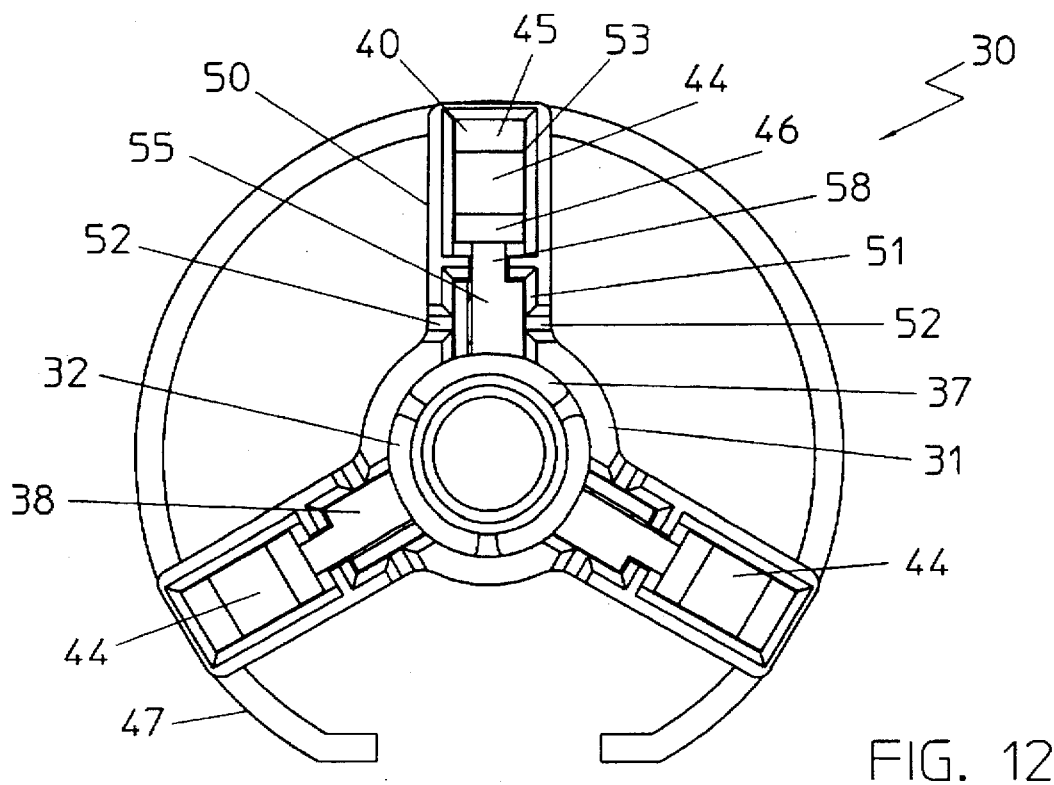
FIG. 12 is an end view of the commutator assembly of FIG. 11.

The embodiment of FIGS. 11 and 12 is similar to that of FIGS. 7 and 8 with the exception that the capacitors 44 extend radially. In this arrangement, the fingers 58 are bent to extend axially to enter the capacitor recesses 53. The capacitor recesses may be open at the front and radially outer sides or the radially outer sides may simply have a slot for accommodating the wire ring 47. As previously, the wire ring may be soldered to the outer terminal face 45 or if suitably guided by the crown, may be sprung to make direct electrical contact while at the same time, resiliently urging the capacitor into radial contact via its inner terminal face 46 with the finger 58 of the commutator segment, thereby creating a totally solder free noise suppressed commutator assembly.

Various modifications may be made to the embodiments described and it is desired to include all such modifications as fall within the scope of the invention as defined in the accompanying claims. For example, the wire ring may or may not be soldered to the capacitor and the capacitor may or may not be soldered to the commutator segments. While in the embodiments, the capacitors have been shown as being placed radially above the terminal portion of the commutator segment, if space permits, the capacitors could be mounted on or above the sliding portion of the commutator segment or accommodated within the terminal recesses of the crown. While for clarity of description, a 3 slot rotor and commutator has been illustrated, rotors of other configurations may be used.

We claim:

1. A rotor for an electric motor comprising:

a shaft, a commutator fitted to the shaft and having a base which supports a plurality of commutator segments, the commutator segments each having a contact portion for making sliding contact with a corresponding brush and each having a terminal portion;

an armature core having a plurality of poles fitted to the shaft adjacent to the commutator segments;

a rotor winding wound around the poles of the armature core, the rotor winding being electrically connected to the commutator segments by the terminal portions, and a capacitive noise suppression arrangement comprising a plurality of chip-type capacitors each having respective first and second terminal faces, the chip-type capacitors extending radially with respect to the shaft and spaced circumferentially about the commutator, and a resilient conductive member electrically contacting the first terminal faces of the chip-type capacitors, the first terminal faces thereby being electrically connected together to form a common connection, the resilient conductive member radially urging the second terminal faces of the chip-type capacitors into electrical contact with respective commutator segments.

2. The rotor as defined in claim 1, wherein the resilient conductive member forms at least part of a ring.

3. The rotor as defined in claim 1, wherein the first terminal faces of the chip-type capacitors are soldered to the resilient conductive member.

4. The rotor as defined in claim 1, wherein the second terminal faces of the chip-type capacitors are soldered directly to the terminal portions of the commutator segments.

5. The rotor as defined in claim 1, wherein the commutator has a plurality of tangs formed on the terminal portions for hot staking the rotor windings and wherein the chip-type capacitors are soldered to the tangs after the tangs have been hot staked.

6. The rotor as defined in claim 1, wherein the second faces of the chip-type capacitors directly contact the terminal portions of the commutator segments.

7. The rotor as defined in claim 1, wherein a flexible adhesive assists in retaining the chip-type capacitors in contact with the commutator segments.

8. A rotor for an electric motor comprising:

a shaft;

an armature core having a plurality of poles fitted to the shaft;

a rotor winding wound around the poles of the armature core;

a commutator fitted to the shaft and having a base, the base supporting a plurality of commutator segments, each commutator segment having a contact portion for making sliding contact with a brush and a terminal portion for making electrical connection with the rotor winding;

a plurality of insulation-displacing-mechanical-connection-terminals for electrically connecting the commutator segments to the rotor winding, one insulation-displacing-mechanical-connection-terminal being disposed on the terminal portion of each commutator segment, the terminal portions being accommodated in a crown of the commutator base;

a plurality of chip type capacitors, each having a first terminal face and a second terminal face, the chip-type capacitors being located in recesses of the crown which extend radially outward from the terminal portions of the commutator segments; and a resilient conductive member electrically contacting each of the first terminal faces of the chip-type capacitors to form a common connection, wherein the second terminal faces of the chip-type capacitors directly contact fingers formed on the terminal portions of the commutator segments.

9. The rotor as defined in claim 8, wherein the chip-type capacitors are orientated axially with respect to the shaft and held in the recesses by the fingers.

10. The rotor as defined in claim 8, wherein the capacitors are orientated radially with respect to the shaft and wherein the second faces of the chip-type capacitors bear directly onto the respective fingers formed on the terminal portions of the commutator segments under the urging of the resilient conductive member.

11. The rotor as defined in claim 8, wherein the resilient conductive member forms at least part of a ring.

12. The rotor as defined in claim 8, wherein the first terminal faces of the chip-type capacitors are soldered to the resilient conductive member.

13. A noise suppression capacitor arrangement for a rotor of an electric motor, the rotor having a shaft; a commutator having a base supporting a plurality of commutator segments and fitted to the shaft, each commutator segment having a contact portion for making sliding contact with brushes and a terminal portion; an armature having a plurality of poles fitted to the shaft adjacent the commutator, and a rotor winding wound around the poles of the armature core and electrically connected to the commutator segments;

wherein the arrangement comprises a plurality of chip-type capacitors, each having a first terminal face and a second terminal face and arranged circumferentially spaced about the commutator and extending radially, and a resilient conductive member in contact with the first terminal faces of the capacitors to form a common connection and urging the second terminal faces of the capacitors into contact with respective commutator segments.

14. The arrangement as defined in claim 13, wherein the resilient conductive member forms at least part of a ring.

15. The arrangement as defined in claim 13, wherein the first terminal faces of the capacitors are soldered to the conductive member.

16. The arrangement as defined in claim 13, wherein the second terminal faces of the capacitors are soldered directly to the terminal portions of the commutator segments.

17. The arrangement as defined in claim 13, wherein a flexible adhesive assists retention of the capacitors in contact with the commutator segments.

18. The arrangement as defined in claim 13, wherein the commutator has tangs formed on the terminal portions for hot staking the rotor windings and the capacitors are soldered to the tangs after the tangs have been hot staked.

19. The arrangement as defined in claim 13, wherein the capacitors connect directly to the contact portion of the commutator segments.

20. A noise suppression capacitor arrangement for a rotor of an electric motor, the rotor having a shaft, an armature core having a plurality of poles fitted to the shaft, a rotor winding wound around the poles of the armature core; a commutator fitted to the shaft and having a base supporting a plurality of commutator segments, each commutator segment having a contact portion for making sliding contact with a brush and a terminal portion for making electrical connection with the rotor winding, each terminal portion having insulation displacing mechanical connection type terminals for connecting with the rotor winding and being accommodated in a crown portion of the commutator base;

wherein the arrangement comprises a plurality of chip-type capacitors, each having a first terminal face and a second terminal face and being located in recesses in the crown portion radially outwardly of the terminal portions and a resilient conductive member contacts each first terminal face of the capacitors to form a common connection and the second terminal faces of the capacitors directly contact fingers formed on the terminal portions of the commutator segments.

21. The arrangement as defined in claim 20, wherein the capacitors are orientated axially and held in the recesses by the fingers.

22. The arrangement as defined in claim 20, wherein the capacitors are orientated radially and bear radially directly onto the fingers formed on the terminal portions under the resilient urgings of the resilient conductive member.

* * * * *